United States Patent
Roth

(10) Patent No.: US 9,887,836 B1
(45) Date of Patent: Feb. 6, 2018

(54) UNIFIED MANAGEMENT OF CRYPTOGRAPHIC KEYS USING VIRTUAL KEYS AND REFERRALS

(71) Applicant: Amazon Technologies, Inc., Reno, NV (US)

(72) Inventor: Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

(21) Appl. No.: 14/498,732

(22) Filed: Sep. 26, 2014

(51) Int. Cl.
*H04L 9/00* (2006.01)
*H04L 9/08* (2006.01)

(52) U.S. Cl.
CPC .......... *H04L 9/0822* (2013.01); *H04L 9/0861* (2013.01); *H04L 2209/24* (2013.01)

(58) Field of Classification Search
CPC . H04L 9/0822; H04L 9/0861; H04L 2209/24; H04L 2209/56; H04L 2209/608; H04L 2209/805; H04L 2209/88; H04L 63/0442; H04L 63/061; H04L 9/0825; H04L 9/084; H04L 2209/601; H04L 63/0428; H04L 63/06; H04L 9/083; H04L 9/088; H04L 9/0891; G06F 19/323; G06F 21/6227; G06F 17/30864; G06F 21/31; G07F 17/32; G07F 17/323; G07F 17/3237; G07F 17/30864; G06K 9/00369; G06K 7/14; H04W 12/06; H04W 4/06; H04W 84/04; H04W 8/20
USPC ......................................... 380/44
See application file for complete search history.

(56) References Cited

U.S. PATENT DOCUMENTS

| 8,601,263 B1 * | 12/2013 | Shankar ............. H04L 63/0428 713/166 |
| 2003/0046238 A1 * | 3/2003 | Nonaka .................. G06F 21/10 705/51 |
| 2009/0276514 A1 * | 11/2009 | Subramanian ...... G06F 21/6218 709/223 |
| 2013/0058478 A1 * | 3/2013 | Yeh ......................... G06F 21/53 380/44 |

* cited by examiner

*Primary Examiner* — Kambiz Zand
*Assistant Examiner* — Abiy Getachew
(74) *Attorney, Agent, or Firm* — Davis Wright Tremaine LLP

(57) ABSTRACT

A cryptography service allows for management of cryptographic keys in multiple environments. The service allows for specification of policies applicable to cryptographic keys, such as what cryptographic algorithms should be used in which contexts. In some contexts, the cryptography service, upon receiving a request for a key, provides a referral to another system to obtain the key.

21 Claims, 11 Drawing Sheets

//(1)

UNIFIED MANAGEMENT OF CRYPTOGRAPHIC KEYS USING VIRTUAL KEYS AND REFERRALS

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Encryption, for example, is used extensively for the purpose of preventing unauthorized access to data. Generally, a cryptographic key is used to reversibly transform data to a state where information is both computationally and humanly unascertainable without access to the cryptographic key or without extraordinary measures (e.g., a cryptographic attack). Oftentimes, a computing environment may include multiple cryptographic keys that may be stored in multiple secure modules. In addition, the allowable uses of cryptographic keys may be regulated and such regulations may impose requirements at the expense of usability. Management of the access and use of cryptographic keys presents particularly significant challenges in larger systems.

BRIEF DESCRIPTION OF THE DRAWINGS

Various embodiments in accordance with the present disclosure will be described with reference to the drawings, in which.

DETAILED DESCRIPTION

Figure 1:
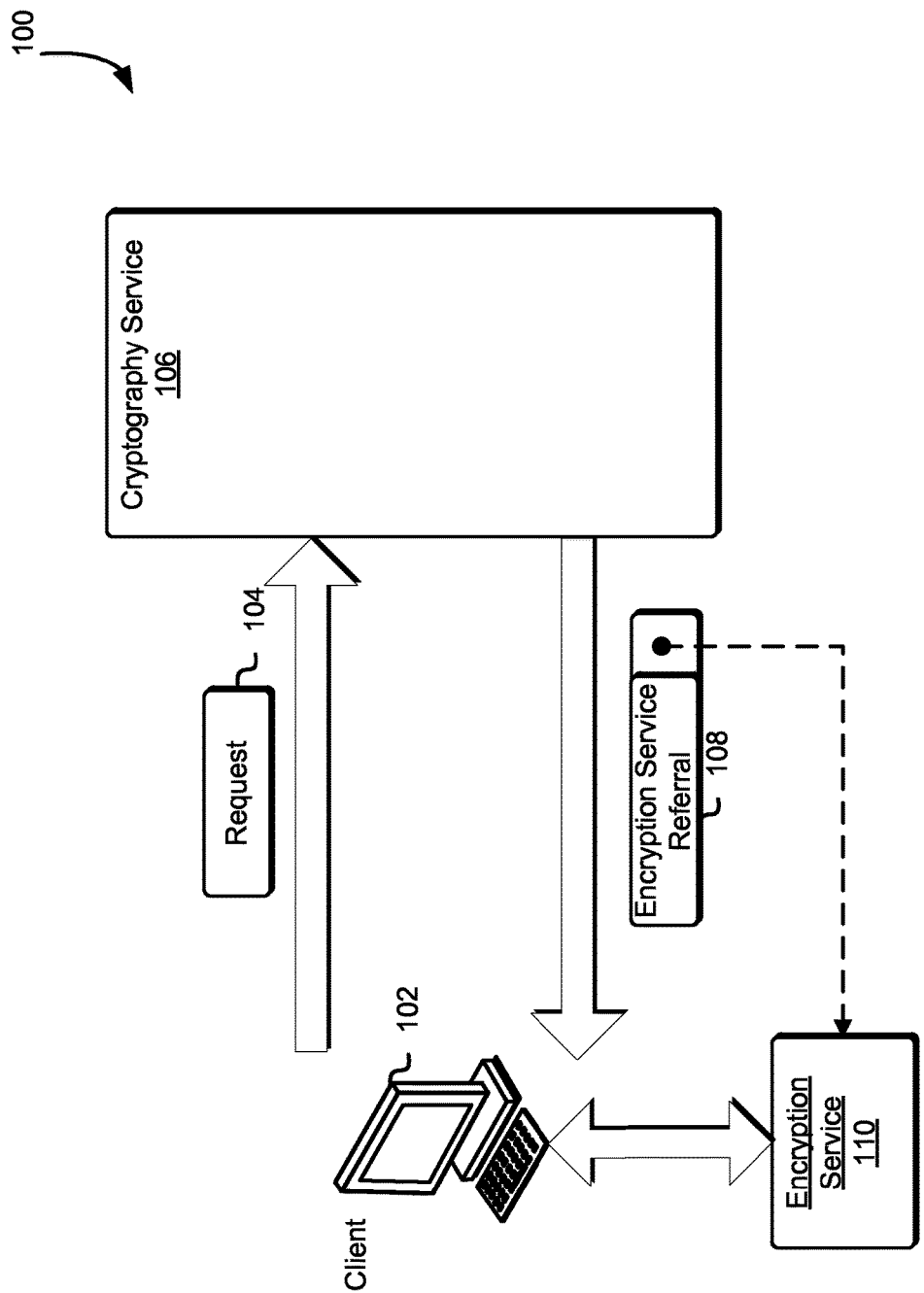
FIG. 1 illustrates an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include unified management of cryptographic keys using virtual keys and key referrals. The management of the cryptographic keys may be performed by a cryptography service that coordinates the access and use of cryptographic keys in a plurality of key stores. A cryptography service may include, for each cryptographic key of a set of cryptographic keys, a plurality of encryption configurations describing how the cryptographic key may be used. The encryption configurations may specify, for example, an encryption algorithm and cipher block size with which the cryptographic key may be used. For each plurality of encryption configurations, a specific encryption configuration may be selected and used with an encryption key to perform cryptographic operations such as encryption and decryption operations.

The selection of a specific encryption configuration from a plurality of encryption configurations may be based on several criteria including but not limited to an encryption context containing metadata about the data to be encrypted and the encryption algorithms the client encrypting the data is capable of performing. In some embodiments, the encryption configurations in a plurality of encryption configurations may be ranked by preference such that an encryption configuration is selectable from a plurality of encryption configurations in a definite order. Encryption configurations may be added, modified, and/or deleted from the cryptography service, for example, as part of a software upgrade and/or in response to the discovery of a security vulnerability in a particular cryptographic algorithm. In some embodiments, changing the encryption algorithm contained in an encryption configuration in the cryptography service may cause the client, without changes to client executable code and/or configurations, to change the encryption algorithm used by the client to encrypt and/or decrypt data.

The cryptography service may provide access to cryptographic keys among a plurality of key stores (e.g., by generating and providing cryptographic keys or referring to other systems that are operable to generate and provide cryptographic keys) and security preferences for how the cryptographic keys should be used by clients that request the keys. With respect to referrals to other systems, the cryptography service may also provide access to a plurality of virtual keys, wherein a virtual key may comprise data or metadata useable to access a cryptographic key that may be located in a key store not accessible or not local to the cryptography service. These instructions may include, for example, a reference type, reference location, reference key identifier, and configuration settings which may be useable to access a cryptographic key.

The cryptography service may include encryption configurations specifying how the cryptographic key should be used by a client of the cryptography service or another system operating in conjunction with the client of the cryptography service. An encryption configuration may specify preferred encryption algorithms, block sizes, and/or virtual keys. The encryption configuration may be applicable globally to the use of all cryptographic keys and all cryptographic operations, or may be applied to a subset of cryptographic keys and/or cryptographic operations. Multiple encryption configurations may exist for a cryptographic key or a subset of cryptographic keys, in which case a relative ordering of preferences may be defined, either statically (e.g., by defining a numerical rank for each policy that exist for a subset of cryptographic keys) or dynamically (e.g., by a computer algorithm whose relative ranking of the subset of policies may change over time and/or logical conditions). Note that an encryption configuration is an example of a cryptographic configuration, where a cryptographic configuration generally specifies how a cryptographic key should be used in cryptographic operations which include, but are not limited to, encryption. As an example, a cryptographic configuration may specify a digital signature algorithm to use. Further, a cryptographic configuration may provide multiple options selectable by the client. For instance, a cryptographic configuration may specify multiple cryptographic algorithms and/or, for an individual cryptographic algorithm, multiple ways of performing the algorithm.

In some embodiments, the key store may be implemented by a hardware security module (HSM) capable of storing cryptographic keys. The key store may be a component included within the cryptography service, within the client, at a remote location and are accessible via an interface provided by the cryptography service, and any combination thereof.

In some embodiments, a client provides data, a key identifier for uniquely identifying a cryptographic key that may be used to encrypting the data, an encryption context of labeled metadata describing the data to be encrypted, client encryption capabilities, and request the cryptography service to encrypt the provided data. The cryptography service may receive the request, obtain a cryptographic key from the key identifier, select an encryption configuration (e.g., an encryption algorithm and a block size) from a plurality of encryption configurations that comply with a security policy, encryption context, and client encryption capabilities. The provided data may be encrypted in accordance with the selected encryption configuration, using the cryptographic key obtained at least in part by using the key identifier, and in accordance with the client encryption capabilities. The encrypted data may be made available such that the encrypted data is capable of being decrypted with the encryption configuration and the cryptographic key used to encrypt the data.

In some embodiments, the cryptography service may impose constraints on the data that may be encrypted by the cryptography service. For example, a cryptography service may require that any data provided to the cryptography service to be encrypted must be less than 8 kilobytes (KB) in size, thereby causing clients to encrypt data greater than 8 KB themselves. This constraint may, for example, be based at least in part on considerations of improved scalability and performance of the cryptography service for a plurality of clients in a multi-client environment. In some embodiments, the cryptography service may return a failure when it receives a request to encrypt data that is beyond the required limit.

In embodiments where data to be encrypted is greater than a size limit enforced by the cryptography service, or in other contexts, the client may transmit an application programming interface request for a data key to the cryptography service. The request may specify a key identifier of a cryptographic key managed by the cryptography service (managed key). The cryptography service may generate or otherwise obtain a data key and encrypt the data key using the managed key. Encryption may be in accordance with an encryption configuration, such as described above and, generally, in accordance with a policy associated with the managed key. The cryptography service may provide a response to the request that includes the data key and the encrypted data key. The client may then use the data key to encrypt the data, delete any in-memory copies of the data key, and store the encrypted data key in association with the encrypted data (e.g., together with the encrypted data or in a database that associates the encrypted data key with the encrypted data). The data may be encrypted by transmitting a request (specifying the key identifier) to decrypt the encrypted data key to the cryptography service. The cryptography service may select the managed key, decrypt the encrypted data key, and provide the decrypted data key in response to the request, thereby enabling the client to use the data key to decrypt the data.

FIG. 1 illustrates an environment in which various embodiments can be implemented. The process 100 illustrates a client 102 issuing a request 104 to a cryptography service 106, and as a response to the request 106, the cryptography service provides an encryption service referral 108 which may include a reference to another system. The reference may contain information useable by the client to connect to and/or access an encryption service. The client 102 may be a computer system configured (e.g., with executable instructions) to perform various operations described herein. The client may operate in accordance with a client application, which may be the executable instructions that configure the client to operate as discussed herein.

In some embodiments, the request 104 is a request to encrypt data, wherein the request may include data to encrypt, a key identifier, additional context metadata describing the data to be encrypted, the encryption capabilities of the client, or a combination thereof. The request may also be a request to retrieve information usable to perform encryption operations—for example, the client may issue a request to the cryptography service for data or information useable by the client to encrypt a data (e.g., a request for a data key). In some embodiments, the request may include a key identifier, encryption context metadata, the client capabilities with regard to encryption, or some combination thereof.

The cryptography service 106 may receive a request from the client and, in response to the request, obtain an encryption service referral 108, and make the encryption service referral available to the client. The encryption service referral may include information useable by the client to perform encryption operations. In some embodiments, the encryption service referral may include instructions or other information for identifying an encryption service, connecting to an encryption service, configuring client settings for connecting to an encryption service, obtaining a cryptographic key accessible by the encryption service, or some combination thereof. In some embodiments, the encryption service referral may comprise a virtual key that may be dereferenced to obtain a cryptographic key. Generally, the referral may comprise information that enables the client to cause the encryption service to perform an operation specified in the request (e.g., providing a data key), where the client would be unable to cause the operation to be performed without the referral.

The encryption service 110 may be a software and/or hardware component that is capable of accessing a cryptographic key useable to perform cryptographic operations such as encryption and decryption. In some embodiments, the encryption service may comprise a hardware security module (HSM) or other device with hardware-based protection of cryptographic material, a cryptography service, and so forth. In some embodiments, the encryption service may be a remote service, an on-premise service (e.g., in a data center facility of the client), or a component included in the client 102.

Figure 2:
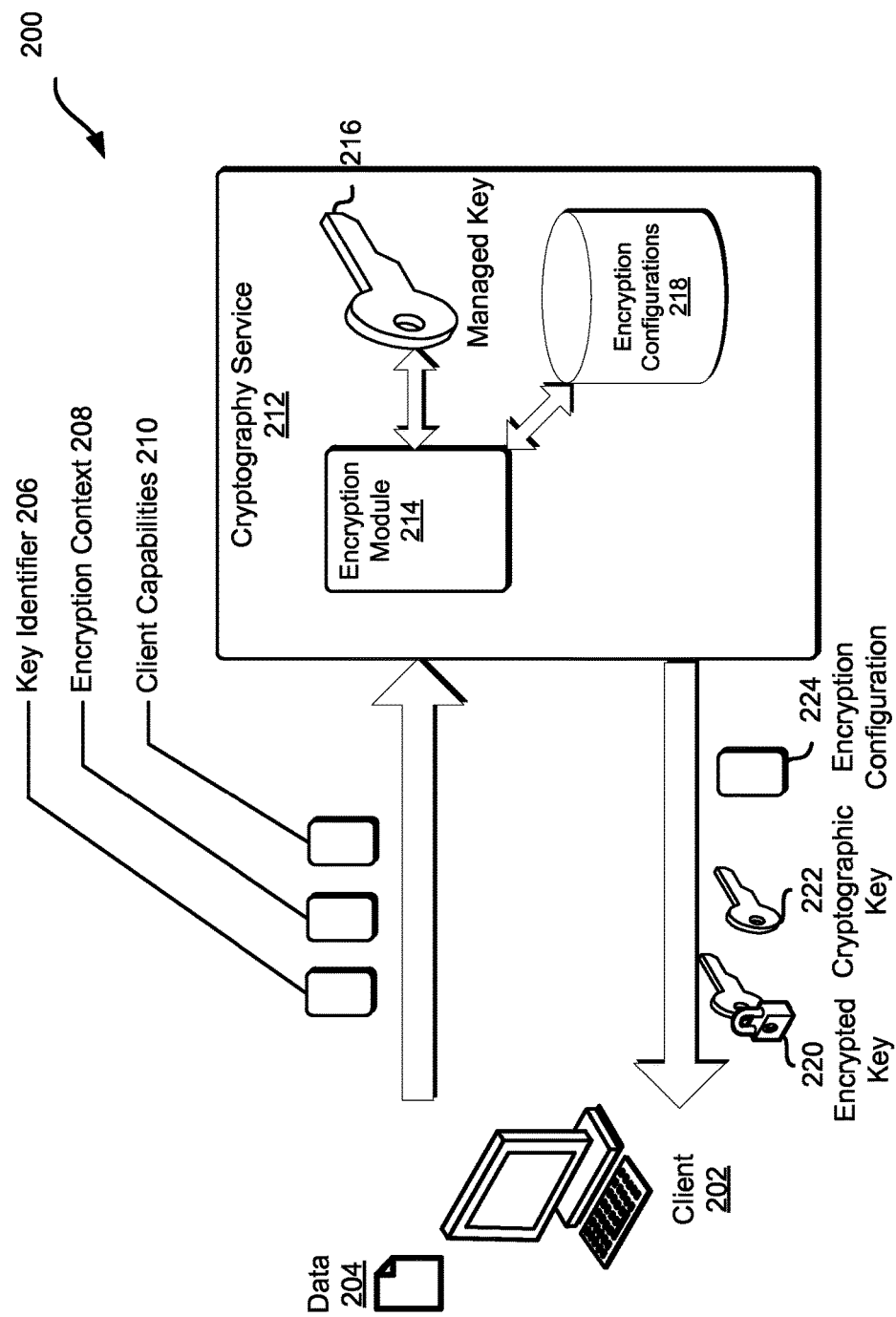
FIG. 2 illustrates an environment in which various embodiments can be implemented.

FIG. 2 shows an illustrative environment 200 for encrypting data 204 in a client 202. The client 202 may make a request to a cryptography service 212 wherein the client requests information from the cryptography service useable to perform an encryption operation. The request may include at least a key identifier 206, an encryption context 208 with metadata about the client and/or data to encrypt, and client capabilities 210 with regard to encryption and decryption. In some embodiments, the key identifier, encryption context, and client capabilities in FIG. 2 are in accordance with the respective components described above in FIG. 1.

It should be known that key identifiers 206 may be, but are not necessarily unique identifiers. For instance, a key identifier may identify a family of keys. For example, in some embodiments, key rotation is performed. Key rotation may involve replacing keys with other keys to prevent collection of enough decrypted data to allow practical cracking of a cipher used.

It should be noted that, when a key identifier does not uniquely identify a key, various techniques may be employed to enable proper functionality. For example, in various embodiments, a family of keys identified by a key identifier is finite. If a decryption operation using a key identified by a key identifier is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptography service to detect that the ciphertext was not generated based at least in part on the key, such as by using authenticated encryption. Other variations are also considered as being within the scope of the present disclosure.

An encryption context 208 may include metadata about the data being encrypted and/or information about the client. For instance, the encryption context may specify a type of the data (e.g., credit card number, social security number, etc.) or information about the client (e.g., an identifier of an application whose execution caused the request to be submitted). An encryption module 214 may use the encryption context to determine whether to permit the encryption call to succeed and/or how to encrypt the data. The encryption module may be any component (e.g., a program module) operable to perform cryptographic operations such as encryption and decryption. The encryption module may be implemented as hardware, software, or a combination thereof. In some embodiments, the encryption module is a program module executing inside of a security module, such as an HSM. The encryption module is not accessible directly by the cryptography service (e.g., the encryption module is not stored on, or accessible strictly by the hardware and software components that comprise the cryptography service), but accessible via another component. For example, the cryptography service may have a secure connection (e.g., a Secure Socket Layer (SSL) connection and/or a virtual private network (VPN) connection) to access an encryption module located on a remote server. In some embodiments, the encryption context includes a key-value map of strings to strings of labeled arbitrary metadata that may be used to determine how to encrypt data. For example, in an embodiment, the encryption context may include a key describing data classifications and values describing the type of data to encrypt, a hypothetical key-value map being "DataClassification" to "CreditCard" that may be useful for determining which encryption configurations 218 are suitable and/or not suitable for encrypting "CreditCard" data.

In addition or alternatively, the encryption context 208 may include information about the client useful for encrypting the data. In an embodiment, the client may make available to the cryptography service 212, as part of the encryption context, characteristics of the client that includes or precludes the use of an encryption configuration to fulfill the request. For example, a client may provide information on its physical geography (e.g., global positioning system (GPS) coordinates, a country identifier and/or other information that indicates a geographic location), and as a result, may impose additional restrictions on which encryption configurations may be used in compliance with local government regulations and/or export of cryptography regulations.

A client capability 210, in an embodiment, is metadata information useful in determining which encryption configurations a client is able to perform encryption and/or decryption operations with. The client capabilities may include various information about the client that is useful for determine what type of encryption the client is capable of performing. Information useful for determining what encryption configurations a client is able to perform may specify the actual encryption algorithms the client is able to perform operations for (e.g., AES-256), information about the software or operation system version useable to determine encryption algorithms supported, and/or information about the hardware configuration such as whether the client machine has access to a secure cryptoprocessor such as a trusted platform module (TPM).

In some embodiments, the encryption module 214 uses both the encryption context 208 and client capabilities 210 to further include and/or preclude encryption configurations for use in a request. For example, the combination of a timestamp, a data classification as a financial or medical record, and a physical geography may be used together to determine what type of regulatory constraints on the encryption of the specific type of data may have been in place for the data to be encrypted.

The cryptography service 214 may receive a request, for example, through an application programming interface, and perform an encryption operation. The cryptography service 214 may include several components, including a managed key 216 that is operable for performing cryptographic operations such as encryption and decryption of data, an encryption module 214 capable of managing and accessing encryption configurations, accessing the managed key, and performing encryption and encryption-related tasks. The cryptography service may include encryption configurations 218 that are accessible via a web server or stored locally within the cryptography service. Within the encryption configurations, a plurality of encryption configurations may be applicable to a plurality of encryption keys. In some embodiments, the managed key is a cryptographic key maintained a secure key store such as a Hardware Security Module (HSM). In some embodiments, the encryption configurations may be stored in a hard drive or database accessible by the encryption module.

Figure 3:
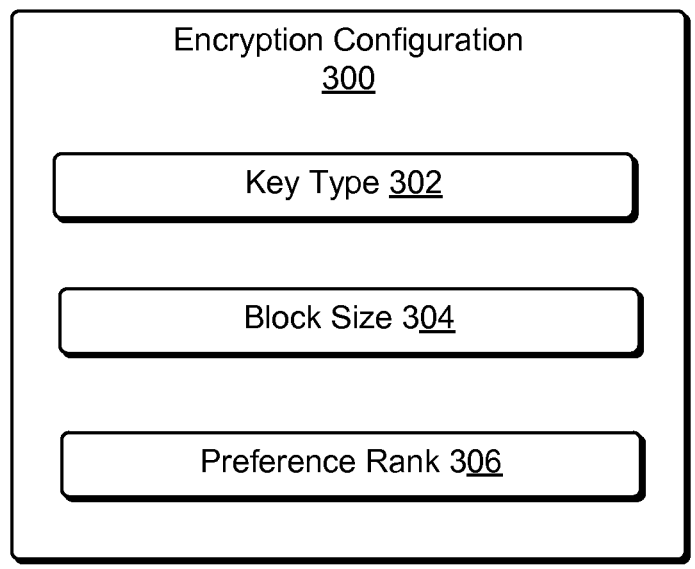
FIG. 3 illustrates an example of an encryption configuration in accordance with an embodiment.
Figure 4:
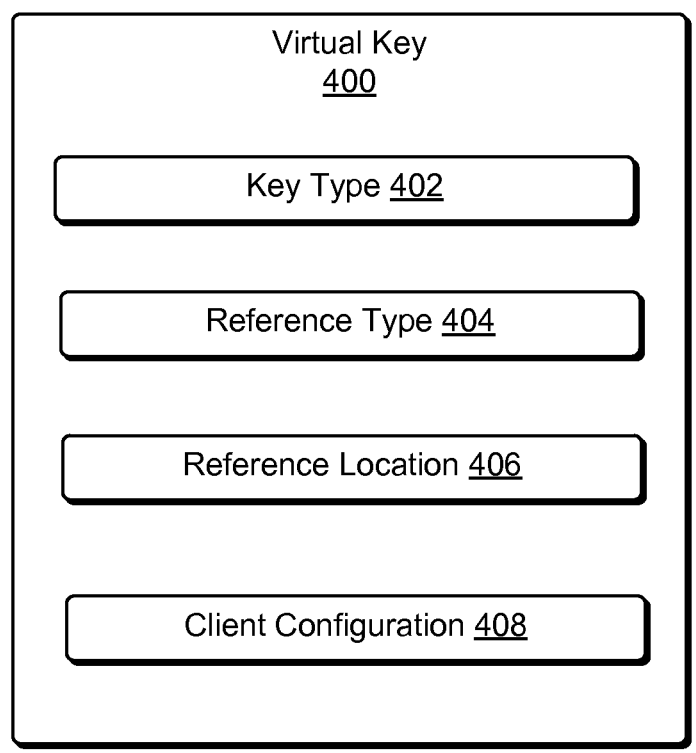
FIG. 4 illustrates an example of a virtual key in accordance with an embodiment.

FIG. 3 shows an illustrative example of an encryption configuration 300, in accordance with an embodiment. An encryption configuration 300, in an embodiment, contains information instructive for performing an encryption and/or decryption operation. In some embodiments, the encryption configuration includes a key type 302 which describe an encryption algorithm (e.g., Advanced Encryption Standard Galois/Counter Mode (AES-GCM)), a block size 304 (e.g., 128-bit) that can be used to perform an encryption operation, and a preference rank 306 useable to select an encryption configuration from a plurality of encryption configurations. In this manner, the key type can be used to generate or otherwise obtain a cryptographic key suitable for use with a cryptographic algorithm specified by the key type 302. Furthermore, in some embodiments, the key type 302 may be a virtual key 400, such as illustrated in FIG. 4.

In some embodiments, a mapping of key identifiers to a plurality of encryption configurations that may be used with the encryption key or encryption keys that may be associated with the key identifier. Thus, in the embodiment previously described, the cryptography service may receive a request to encrypt data, use the key identifier to obtain an encryption key, retrieve a plurality of encryption configurations associated with the key identifier (e.g., where some or all encryption configurations were installed as a result of API calls to the cryptography service), select an encryption configuration from the plurality of encryption configurations associated with the key identifier, and perform an encryption operation on the data using the retrieved encryption key and the selected encryption configuration as inputs. Furthermore, in some embodiments, a key identifier may not map to any encryption configurations, in which case suitable logic for handling such a case may exist. Suitable logic may include selecting a default global or static encryption configuration, providing an error message, and so forth.

In the embodiment shown in FIG. 2, the managed key 216 is accessible by the encryption module 214 and is a component included in the cryptography service. In other embodiments, the managed key is not a component included in the cryptography service, but may be accessible to the encryption module 214 through various mechanisms. For example, the cryptography service may have a secure connection (e.g., a Secure Socket Layer (SSL) connection and/or a virtual private network (VPN) connection) to access a managed key located in a data store accessible via a remote server. In some embodiments, the cryptography service may need to be authenticated as a trusted component before accessing the managed key, for example through an authentication process such as code-signing.

Encryption configurations may include metadata useful in selecting a specific encryption configuration from the plurality of encryption configurations. In some embodiments, the encryption configurations in the plurality of encryption configurations are strictly ordered and may be assigned a preference rank relative to other encryption configurations in the plurality. In other embodiments, the plurality of encryption configurations may be assigned a preference rank as described above but are not strictly ordered. These preferences may be assigned a priori, or may be dynamically calculated. In addition, it should be noted that the relative ordering of encryption configurations may be different in different pluralities. For example, the plurality of encryption configurations associated with key identifier #1 may have AES-GCM preferred over AES-CCM, whereas the plurality of encryption configurations associated with key identifier #2 may have AES-CCM preferred over AES-GCM (i.e., the preferences are reversed). These preference ranks are usable to select a specific encryption configuration from a plurality of encryption configurations.

In an embodiment, the encryption module 214 (or another module executed by the same computer system) is capable of generating cryptographic keys. For example, the encryption module 214 may have access to an entropy source suitable for generation of high quality random numbers. In such an embodiments, the cryptography service may generate a cryptographic key, encrypt the cryptography key using a managed key, and provide to the client as a response to the request the encrypted key 220, the cryptographic key 222 (data key), and the encryption configurations 224. The client may use at least the cryptographic key and encryption configuration received by the client to perform encryption operations on the data 204 accessible by the client, discard the cryptography key after completing the encryption operation (e.g., by overwriting any memory locations having a copy of the cryptographic key 222 and/or by allowing such memory locations to be overwritten over time), and store the encrypted data and encrypted data key 220.

Later, to decrypt the encrypted data, the client may provide the encrypted key to the cryptography service and request the cryptography service to decrypt the key. In such a decryption request, the managed key may be specified explicitly (e.g., using a key identifier) or implicitly (e.g., as a default associated with a customer or, generally, by including information that is usable to determine the managed key from multiple managed keys but that is not classified as a key identifier). Upon receiving the decrypted key, the client may then use the received decrypted key to perform a decryption operation on the encrypted data to obtain the unencrypted data.

The client may perform encryption operations using any suitable method. In some embodiments, the client may include an encryption module and may perform the encryption operation within the client. In some embodiments, the client may delegate the encryption operation to a local gateway that includes an encryption module by providing to the local gateway instructions to encrypt, the instructions including at least the data to encrypt, the cryptographic key, and the encryption configuration. Generally, the client may encrypt data or cause to be encrypted data (e.g., by another system) in any suitable manner.

In some embodiments, the data 204 to be encrypted may be several gigabytes or terabytes large, and there may exist advantages to the client performing at least part of the encryption operation. For example, the time required to send the file to the cryptography service may be a performance bottleneck where the network connection between the client and cryptography service may be a variable quality network link (e.g., an internet connection). Furthermore, in some embodiments, the encryption of large data files may result in degraded performance, for example, in a multi-tenant network system where encryption operations are performed synchronously and block other clients until completion of the operation.

Figure 5:
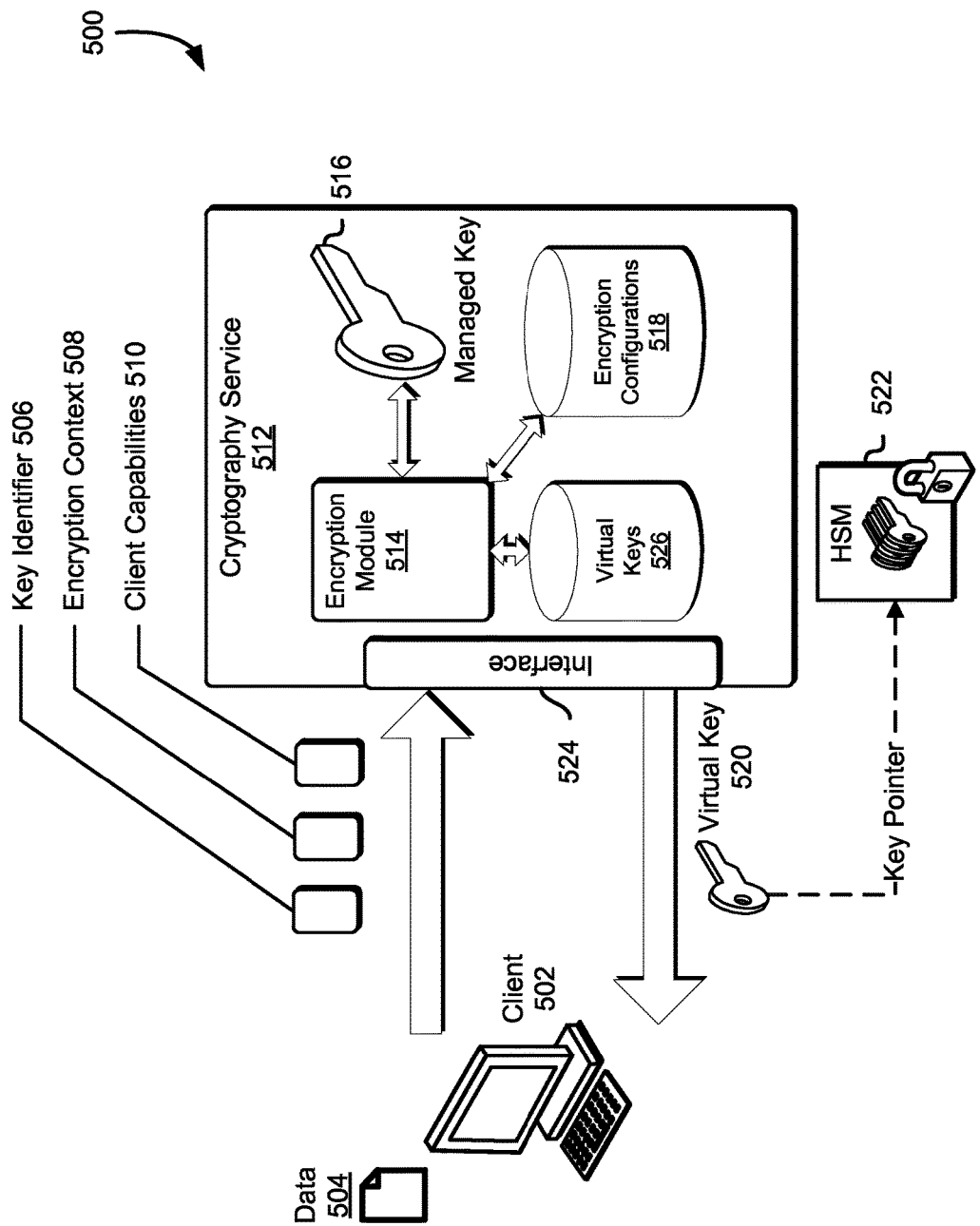
FIG. 5 illustrates an environment in which various embodiments can be implemented.

FIG. 5 describes an environment 500, which may be one of the environments described above, in which a cryptography service provides a unified management of cryptographic keys located in a plurality of HSMs. In the embodiment shown in FIG. 5, the client 502 may provide a key identifier 506, encryption context 508, and client capabilities 510 as previously discussed above in FIG. 2. In an embodiment, requests access cryptographic keys stored in a plurality of remote HSMs (e.g., 522) through an interface 524 exposed by the cryptography service. It should be noted that although one remote HSM 522 is shown, that embodiments of the present disclosure are not necessarily limited to one remote HSM, but other embodiments may include a plurality of remote HSMs. In addition, while an HSM 522 is shown for the purpose of illustration, other cryptographic devices may be used.

Upon receiving the request, the encryption module may perform a lookup to find a virtual key associated with the key identifier 506 provided. In some embodiments, the cryptography service and/or on-premise HSMs may include a plurality of virtual keys 526. The plurality of virtual keys 526 may be stored in any suitable manner, including as a file or files, a database record or database records, or within a HSM. In some embodiments, the remote HSM 522 may also include a second plurality of virtual keys. Different virtual keys may correspond to different HSMs or other computer systems (e.g., other service provider systems) operable to perform cryptographic operations. Note that, in some embodiments, the request may not specify whether a virtual key or managed key is to be used. Accordingly, the cryptography service, when processing the request, may utilize a database or other mechanism to determine whether to utilize a managed key to fulfill the request or a virtual key. Such a determination may be made based at least in part on a policy associated with a key identifier specified in the request. For example, a customer may transmit API calls to the cryptography service for the purpose of management of on-premise and/or off-premise cryptographic keys (some or all of which may be managed by the cryptography service). Such policies may specify the specific cryptographic key to use. In some embodiments, API calls to provision cryptographic keys may be configured to cause the cryptography service to provision a managed key or a virtual key. Different API call types may be submitted for keys to be managed by the cryptography service than for virtual keys.

A virtual key 400, in an embodiment, is a cryptographic object that contains information operable to access a cryptographic key stored in the plurality of HSMs. The cryptographic key referenced by the virtual key may be stored in a HSM remove server (remote from the perspective of both the client and the cryptography service), within a HSM accessible locally by the client (e.g., on the client's local network), within the HSM located in the cryptography service, and, generally in any location to which the client is able to use information in a virtual key to cause cryptographic operations to be performed. In an embodiment, a key type 402, a reference type 404, a reference location 406, and a client configuration 408 comprise a virtual key.

The key type 402 may be information that distinguishes a virtual key from a cryptographic key. The key type may be denoted in software by several means, including, but not limited to, an integer, a Boolean, an enumerated data type, a string, or a combination of those data types. In an embodiment, the key type may be implemented as an enumerated data type with at least two enumerated values that distinguish virtual keys from cryptographic keys.

The reference type 404 may include metadata useable for establishing a connection to access the component storing the cryptographic key referenced by the virtual key. In an embodiment, the reference type may include information on what type of plugin may be used to access a cryptographic key stored in a remote HSM. Examples of plugins may include SafeNet IPSec and Public-Key Cryptography Standards (PKCS) #11 plugins. In some embodiments, multiple plugins may be operable to access the cryptographic key stored in the remote HSM 522. The cryptography service may require the client to provide, in the client capabilities 510, which plugins the client supports and perform a compatibility check that the client supports a plugin enumerated in the virtual key. The cryptography service may detect that there is a computability error (i.e., the client does not support any of the plugins listed in the virtual key's reference type) and take action accordingly. For example, the cryptography service may dispatch an error message, log the error, notify a system administrator, and/or perform an upgrade of the client to make it compatible with the virtual key.

The reference location 406 may include information useable by the plugin to access the component storing the cryptographic key or set of cryptographic keys referenced by the virtual key. In some embodiments, the reference location includes an Internet Protocol (IP) address (or information that maps to an IP address, such as a uniform resource locator (URL) and a key identifier that identifies to the referenced system the particular cryptographic key or set of cryptographic keys that are referenced by the virtual key.

The client configuration 408 may include information specific to accessing the cryptographic key or cryptographic keys referenced by the virtual key. In an embodiment, the client configuration may include information that the client may use to determine how to properly interact with the component storing the cryptographic key or set of cryptographic keys referenced by the virtual key. As an example, the client configuration may include information on the credentials required for access (e.g., Administrator access required), or in some embodiments may include the credentials themselves. However, it should be noted that in some embodiments, the cryptography service does not have sufficient information to access a cryptographic key referenced by a virtual key stored in the cryptography service—for example, a virtual key with a client configuration that includes the Username required to gain access to a key (and not the password) may be insufficient to gain access to the cryptographic key referenced by the virtual key.

In some embodiments, an encryption configuration may contain a virtual key. Three example encryption configurations in accordance with at least one embodiment are presented below:

[KeyType="AES-GCM"; BlockSize="256 bits"; Preference Rank="1"]
[KeyType="AES-CCM"; BlockSize="128 bits"; "Preference Rank="2"]
[KeyType="Virtual"; ReferenceType="HSM_MFR"; ReferenceLocation="10.1.3.7/ID=32";
ClientConfiguration="HSM_CONFIG_1"; Preference Rank="3"]

Note that, while FIG. 4 shows an illustrative example of a virtual key that may be used in various embodiments, the scope of the present disclosure includes other ways of referencing other systems. As an illustrative example, the virtual key may include an identifier or other information usable by a client to determine locally stored or otherwise accessible configuration information that includes some or all of the information discussed above, such as a location of another system and/or credentials for causing the other system to perform operations.

Figure 6:
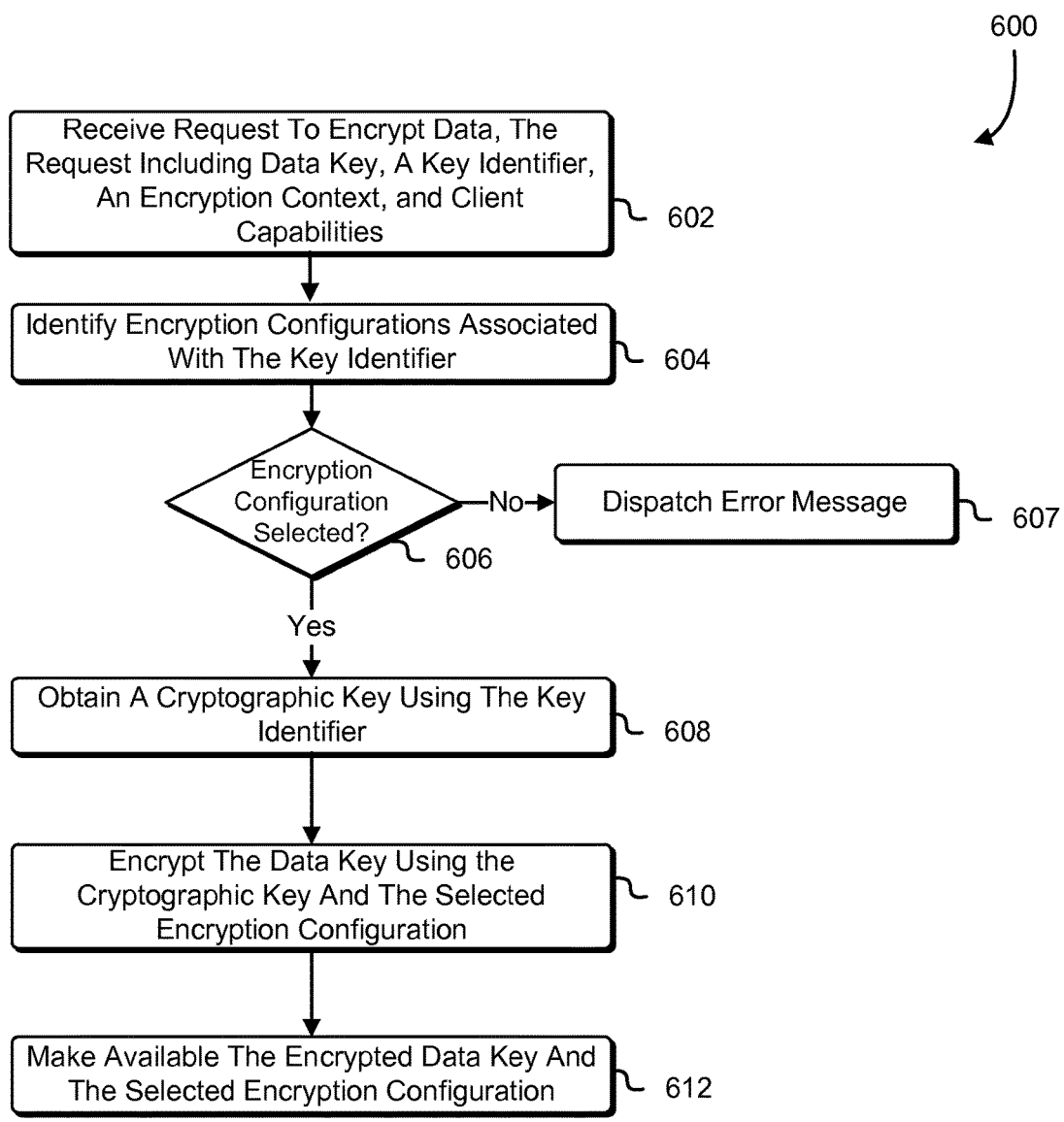
FIG. 6 is an illustrative process for providing an encrypted data key capable of being authorized, in accordance with an embodiment.

As noted above, FIG. 2 shows, in the context of the environment 200, how a request for a data key may be processed in various embodiments. In particular, the cryptography service generates and provides the data key along with other information. In alternate embodiments, the client generates the data key itself, but still uses the cryptography service as part of its operations. FIG. 6 describes an illustrative process 600 for processing a request to encrypt data in accordance with an alternate embodiment. The process 600 may be performed by any suitable system, such as the cryptography service or a component thereof, such as a security module or a web server together with a security module. For the purpose of illustration, the process 600 is described in connection with a cryptography service, although other systems may utilize techniques described herein. The cryptography service receives in 602 a request to encrypt a data key, the request including at least a data key, a key identifier, an encryption context, and client capabilities. The request may be made by any suitable software methods, for example, as an API call which may be in the form of a hypertext transfer protocol (HTTP) request, a remote procedure call (RPC), interface, and so forth. Note that the request may be a request to encrypt data where the data being a data key is not determinable from the request (e.g., the request may not explicitly state that the data is a data key) and, such a request may be used for other types of data.

Upon receiving the request, the cryptography service may identify 604 the plurality of encryption configurations associated with the key identifier. The association between the key identifiers and encryption configuration may be a many-to-many mapping such that a plurality of encryption configurations may map to a key identifier, and an encryption configuration may be mapped to a plurality of key identifiers. The mapping may be stored in any suitable manner, including but not limited to a data file or data files, a record or records within a database, and other stores accessible to a component of the cryptography service (e.g., a web server or application server) that identifies 604 the configurations. In some embodiments, an indexer may be used to improve the query time to access which encryption configurations are associated with a key identifier. Additionally, in some embodiments a cryptographic key or some unique key identifier may map to the encryption configurations instead of the key identifier.

The cryptography service may select 606 a specific encryption configuration from the plurality of encryption configuration associated with the key identifier or cryptographic key. There are several suitable methods for selecting a specific encryption configuration. In some embodiments, the preference or rank may be associated with each encryption configurations and may be based at least in part on degree of security provided by each configuration. In other embodiments, each key identifier may have associated with it an ordered list or vector of encryption configurations wherein the ordering of the list or vector determines the relative rank of the encryption configurations in the list or vector. Furthermore, the selection method may also use the encryption context in selecting an encryption configuration. The encryption context may include metadata about the data to be encrypted placing additional restrictions on the selectable encryption configurations. As with all processes described herein, variations of the process 600 are considered as being within the scope of the present disclosure. For instance, as noted above the encryption context may provide metadata that describes the information to ultimately be encrypted (e.g., either by the cryptography service or by the client) as particularly sensitive (e.g., a password or private key) and require stronger encryption algorithms be used.

In some embodiments, the cryptography service may determine that no encryption configuration is selectable to meet all the selection criteria that must be satisfied. For example, no encryption configuration may match any of the specified client capabilities. In such an embodiment, the encryption configuration may dispatch 607 an error message to the client, informing the client that the request has failed. In alternative embodiments, the encryption service may instead of, or in addition to, dispatching an error message to the client, also log the failure on the cryptography service, and/or notify the service's system administrator.

The cryptography service may identify 608 a cryptographic key with the key identifier. The key identifier may be any type of reference value that may be used as an identifier, such as a globally unique identifier (GUID), universally unique identifier (UUID), object identifier id (OID), and so forth. As noted, in alternate embodiments, the cryptographic key may be identified implicitly, such as by a default associated with the requestor (e.g., a particular client application) or an entity associated with the requestor (e.g., a customer of a service provider). In some embodiments, a hashing function may map key identifiers to cryptographic keys, for example, using a hash map, hash table, and/or other associative data structures. In addition to or as an alternative, key identifiers may be associated with cryptographic keys by various other software implementations including indexed databases. In some embodiments, a key identifier may be mapped to another value that provides metadata for identifying a cryptographic key. For example, a key identifier may map to a memory address location, file path, and/or network storage path that may contain the associated cryptographic key. In some embodiments, key identifiers may be associated with a plurality of cryptographic keys and/or no cryptographic keys. In some embodiments, a HSM may require the key identifier in order to retrieve a cryptographic key matching the key identifier.

The cryptography service may encrypt 610 the data key using the cryptographic key identified in 608 and encryption configuration selected in 606 to produce a ciphertext version of the data key (encrypted data key). In some embodiments, the encryption module 214 may receive a cryptographic key from a key identifier and may select from a plurality of encryption configurations 218 a specific encryption to use in accordance with the selection process 606 described above. The encryption module may then examine the encryption configuration to perform an encryption operation in accordance with the encryption configuration. In some embodiments, the encryption operation may require a nonce or initialization vector (IV). A nonce, in an embodiment, is an arbitrary number such as a random or pseudo-random number, or may be deterministically selected, for example, a timestamp or counter. In some embodiments, the nonce may be used to generate an IV which may be random or pseudo-random, or may be stateful (e.g., a counter mode of operation) and may be non-repeating. The initialization vector may be used to operate a stream cipher in modes of operation which are capable of securely encrypting data that is larger than the block size. For some cryptographic algorithms, the terms nonce and IV are interchangeable.

After the data is encrypted 610, the encrypted data key and selected encryption configuration are made available 612 to the client. In some embodiments, these may then be returned to the client synchronously via a response to the request call or may be returned asynchronously, for example, through a callback function. In other examples, the encrypted data and selected encryption configuration may be stored in memory or persistent storage and retrievable by the client later.

An example encryption process in accordance with 600 is described below. The cryptography service may receive a request from a client to encrypt, the request containing a data key, a GUID as a key identifier, an encryption context that labels data associated with the data key (e.g., data to be encrypted by the data key or the data key itself) as including personally identifiable information (PII) (examples of an individual's PII include—social security number, birthdate, place of birth, mother's maiden name, and biometric data), and the version number of the client's encryption software as client capabilities. Upon receiving the request, the encryption module may generate a cryptographic key. Upon receiving the request, the encryption module may also use the GUID identifier to retrieve a list of encryption configurations associated with the GUID identifier and order the list according to preference rank. After retrieving the list of encryption configurations associated with the GUID identifier, the encryption module may check whether the most preferred encryption configuration is selectable. The encryption configuration may be selectable or not selectable based at least in part on criteria defined by the encryption context and client capabilities. In this particular example, two criteria for the selection of an encryption configuration may exist—the encryption context may require that a stronger encryption algorithm be used (due to the sensitive nature of the data being encrypted) and regulatory constraints (e.g., privacy laws) may require that the data is encrypted in a form that is capable of being decrypted by the client's encryption software. The encryption module may determine these restrictions and check whether the most preferred encryption configuration meets these criteria and select it if the criteria are met. However, if the criteria are not met by the most preferred encryption configuration, the encryption configuration may check whether the second encryption configuration (by preference rank) meets the selection criteria, etc., until an encryption configuration satisfying the selection criteria is found.

Upon selecting an encryption configuration (or dispatching an error message if none is found) the encryption module may encrypt the data key using the encryption algorithm from the selected encryption configuration. For some encryption algorithms, such as AES-GCM, the encryption module may, in addition, generate a nonce useable in performing the encryption operation.

Figure 7:
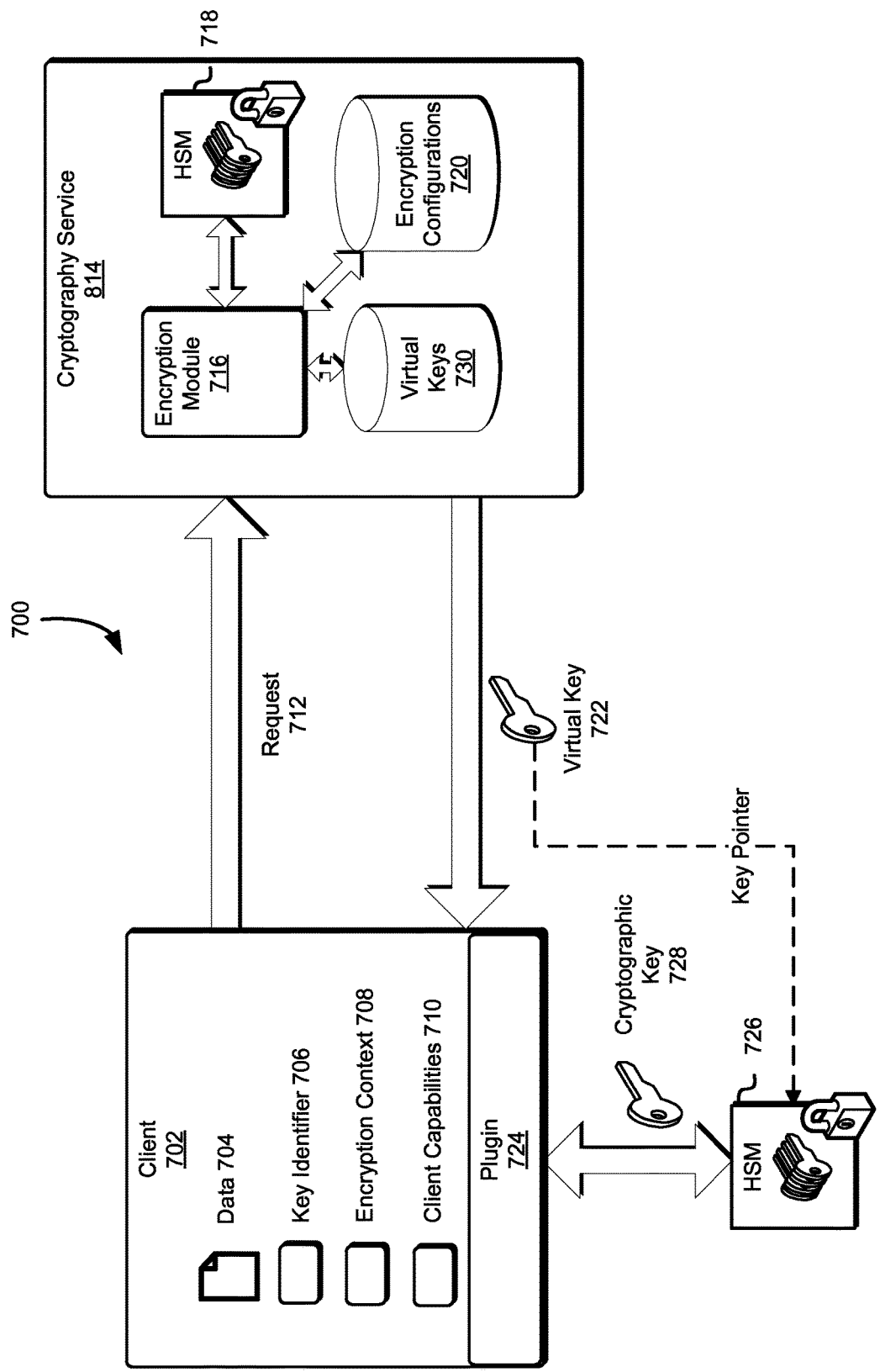
FIG. 7 is an illustrative process for providing a cryptographic key and encryption configuration operable to perform an encryption operation, in accordance with an embodiment.

FIG. 7 illustrates an environment 700 including virtual keys operable to refer a client to a HSM 726. The environment 700 may be an environment such as described above. The client 702 may store or otherwise have access to data 704 to encrypt, a key identifier 706 that is useable to obtain a cryptographic key or virtual key, an encryption context 708 that includes metadata about the data 704 to encrypt, and client capabilities 710 that describe the operations the client is capable of performing. This information (804-810) may be included in a request 712 to a cryptography service.

The key identifier 706 may be associated with a virtual key 722 that is included within a store of virtual keys 730, wherein the key identifier is useable to retrieve the virtual key 722. In some embodiments, the virtual keys may be stored in a component that does not have the secure cryptographic properties present in HSMs, such as a generic hard drive or database or another data storage system, which may be a data storage service of a service provider that provides the cryptography services using the cryptography service. In some embodiments, the key identifier may include information that allows the encryption module to determine whether the associated key is a cryptographic key or a virtual key. In other embodiments, the key identifier may not have any information operable to determine the associated key's type (e.g., key identifiers that are randomly generated strings or numbers).

The request 712 to the cryptography service may be made by any suitable software method, for example, as an API call which may be in the form of a hypertext transfer protocol (HTTP) request, a remote procedure call (RPC), interface, and so forth. In some embodiments, the request includes at least the key identifier 706, encryption context 708, and client capabilities 710.

The client capabilities 710 may include information that indicates it has a plugin 724 that may be operable to communicate with a remote HSM 726. Note that the client capabilities 710 may specify multiple plugins, each for a different HSM and/or different source of cryptographic key. The HSM 726 may be remote (relative to the cryptography service) and/or may be located on-premises with the client 702 (an on-premise HSM). In some embodiments, the client includes or has local access to an on-premise HSM due to legal or regulatory requirements. Note that, instead of an HSM, another cryptography service of another service provider may be used, such as a service provider in a different legal jurisdiction than the cryptography service 714. In some embodiments, the system may be designed to store a first plurality of cryptography keys in an on-premise HSM 726 and a second plurality of cryptographic keys in a HSM included in the cryptography service 718. In some embodiments, the managed key 216 is stored in the cryptography service's HSM 718. In the embodiment just described, the first and second pluralities may not be disjoint sets (i.e., there may exist a set of cryptographic keys in both the on-premise HSM 726 and the cryptography service's HSM 718). In some embodiments, there cryptography service may not store any cryptographic keys for a customer associated with the client.

In some embodiments, the plugin 724 may be a software plugin, a hardware component, or a combination of hardware and software. The plugin may be useable by the client to interact with the on-premise HSM 726. The plugin 724 may contain code, data, and resources in any combination and in some embodiments may be a dynamically linked library (DLL), executable (EXE), static library (LIB) and so forth. In some embodiments, the plugin may not be fully operable without a security token such as PIN, password, software token, smartcard, biometric data, and so forth. Examples of plugins may include SafeNet IPSec and Public-Key Cryptography Standards (PKCS) #11 plugins.

The virtual key 722 is operable to provide the plugin 724 information useable to retrieve a cryptographic key from the HSM 726. The virtual key may specify a plugin among a plurality of plugins useable by the client 702 and may further indicate how the plugin may interact with the on-premise HSM. In an embodiment, the virtual key may specify the IP address of the on-premise HSM, a key identifier useable to retrieve a cryptographic key from the on-premise HSM, a set of credentials or configurations the client may use to establish a connection with the on-premise HSM, and/or the cryptographic protocol with which the plugin should communicate to the on-premise HSM with, for example, transport layer security (TLS). In some embodiments, the key referenced by the virtual key may be a second virtual key rather than a cryptographic key. When the client receives the information, it may load the specified plugin (if not already loaded) and use the information to cause the HSM to generate and provide a cryptographic key and the cryptographic key encrypted under a key identified by the key identifier (which may be identified by another key identifier than the key identifier in the cryptography service). The client may then use the cryptographic key to encrypt the data and may store the encrypted data in association with the encrypted key so that, at a later time, the client or another client may later use the decrypted encrypted key to decrypt the data.

Decryption of the encrypted data key may be performed similar to the manner in which it was decrypted. For example, the client may transmit a request to the cryptography service (specifying the key identifier used by the cryptography service) and the cryptography service may provide the virtual key in response. The client may use the information in the virtual key to cause the HSM 726 to decrypt the encrypted data key and provide the result of the decryption so that the client (or another system) can decrypt the data. Note, however, that, in some embodiments, the encrypted data may be stored in association with information that enables the client or another client to transmit a request to the HSM 726 directly without the need to transmit a request to the cryptography service to obtain the virtual key.

As noted, the information in the virtual key may be provided to the cryptography service by way of an API call to the cryptography service by a customer of the cryptography service, where fulfillment of the API call includes associating the information with the key identifier.

Figure 8:
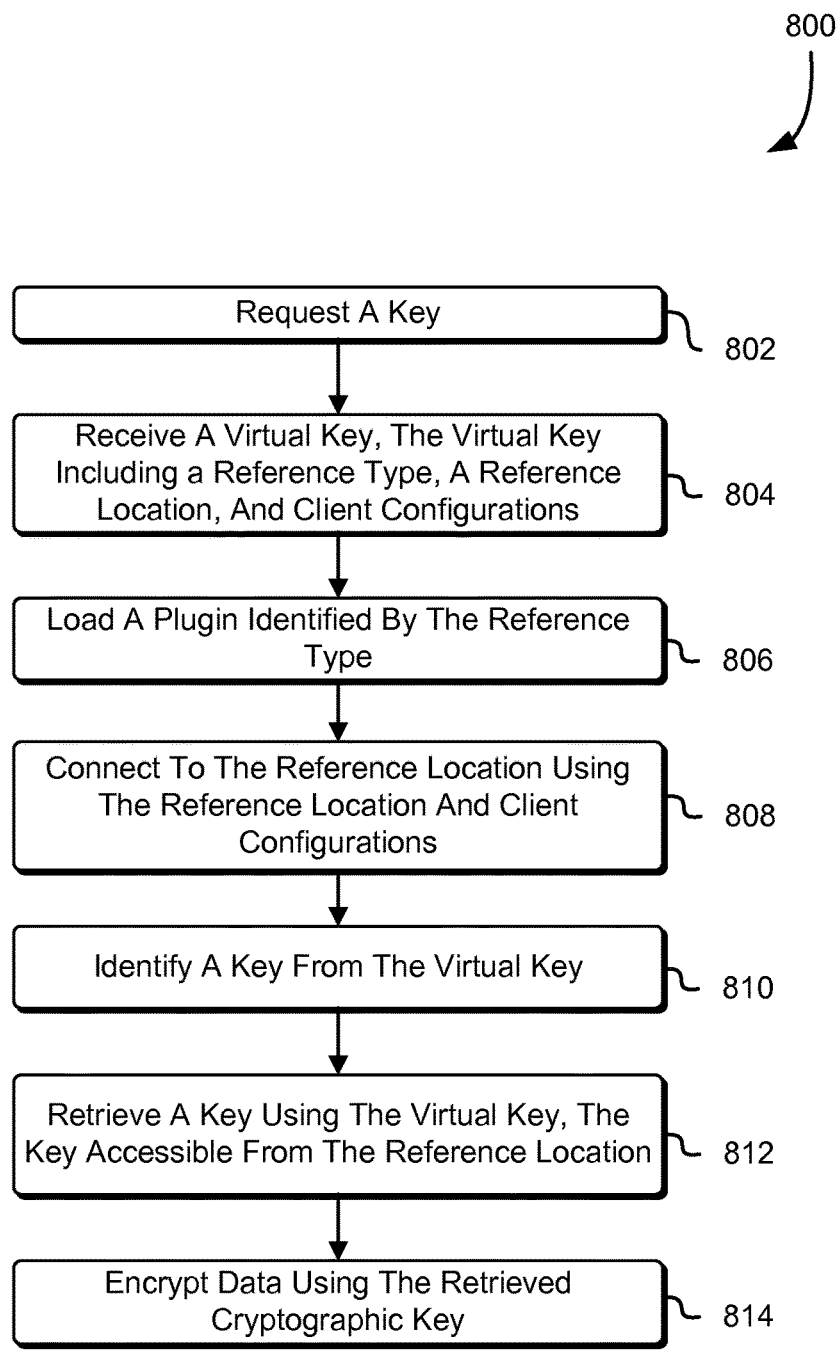
FIG. 8 illustrates an environment in which various embodiments can be implemented.

FIG. 8 describes an illustrative example of a process 800 for encrypting a data file using a virtual key. The process 800 may be performed by any suitable system, such as the client or a component thereof. For the purpose of illustration, the process 800 is described in connection with a client such as the client described in FIG. 8. The client may make a request 802 to a cryptography service for a cryptographic key. In some embodiments, the client may more generally request a key which may be a cryptographic key or a virtual key. The request may not distinguish between a cryptographic key managed by the cryptography service and a virtual key. The request may include the data to be encrypted, the key identifier, encryption context, and client capabilities 810 and combinations thereof. The request may be received by a cryptography service and the key may be retrieved by the encryption module. The virtual key may be made available to the client by the cryptography service after which the client may receive 804 the virtual key by any suitable software method, for example, as a parameter of an API call response. In some embodiments, the client may also receive an encryption configuration.

As a result of information contained in the virtual key indicating the use of a plugin, the client may load 806 the plugin identified by the virtual key or determine that the plugin is already loaded. The client may include or have access to a plurality of plugins suitable for connecting to an on-premise or remote HSM. Thus, in some embodiments, the reference type included in a virtual key may be useable to select a plugin from a plurality of plugins that may be used to establish a connection with a remote or on-premise HSM.

After loading the plugin, the client may instruct the plugin to connect 808 to a remote or on-premise HSM using at least the reference location and client configurations included in the virtual key. (In other words, execution of a client application may cause execution of the plugin to cause connection in accordance with the plugin.) In some embodiments, the reference location may include a website URL, an IP address, and/or a domain name that the plugin may use to establish a connection with the HSM. The reference location may include additional information that may be used, after establishing a connection with the HSM, by the client to identify 810 the cryptographic key referenced by the virtual key, the cryptographic key accessible via the connection with the HSM. The additional information may, for example, comprise a key identifier that may be used to obtain a cryptographic key from the remote or on-premise HSM (which may be a different identifier than used by the cryptography service). In an embodiment, the reference location includes an IP address and a key identifier, where the IP address may be used by a plugin to establish a connection with the HSM, and the key Identifier may be used to retrieve the cryptographic key from the HSM. In some embodiments, the plugin may be used to establish a connection to a second cryptography service which may provide an encrypted data key and an encryption configuration useable to perform encryption operations.

The client may identify a key from information in the virtual key and issue an instruction to the plugin to obtain the cryptographic key identified in the virtual key from the remote or on-premise HSM, for example, by issuing a request for a cryptographic key, the request including at least a key identifier. In some embodiments, this request may be made in the same manner as the request described above in FIG. 2. In some embodiments, a second virtual key rather than a cryptographic key may be retrieved from the remote or on-premise HSM. In such an embodiment, the cryptographic key referenced by the second virtual key may be obtained following the same steps 802-812 of the process 800 until a cryptographic key is obtained. In some embodiments, multiple layers of indirection may exist, wherein a layer of indirection refers to a reference to a key (virtual or cryptographic) by a virtual key. Upon retrieval 812 of the cryptographic key, the client may encrypt 814 data using the cryptographic key and encryption configuration.

Figure 9:
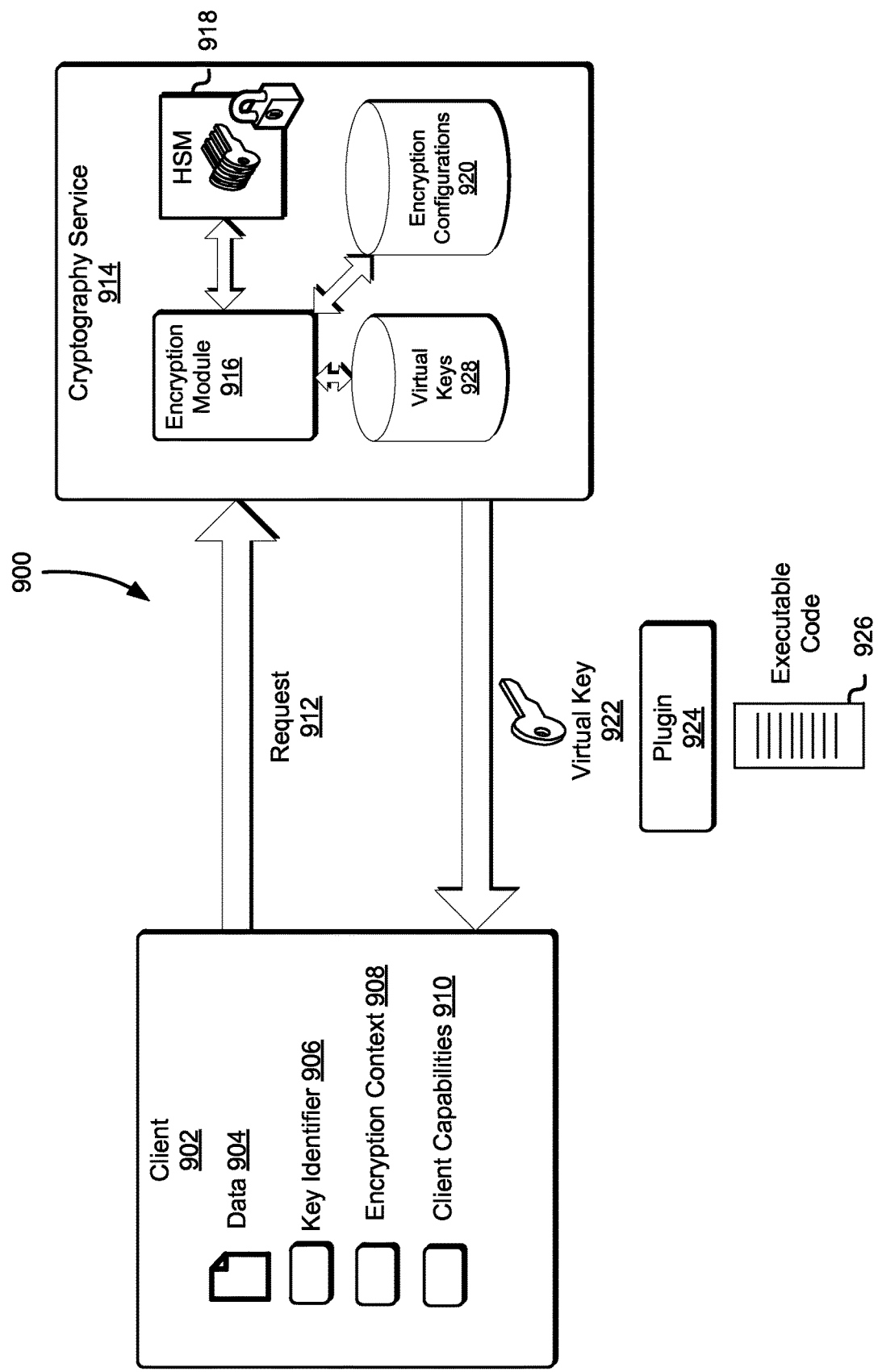
FIG. 9 is an illustrative process for encrypting data using a virtual key, in accordance with an embodiment.
Figure 10:
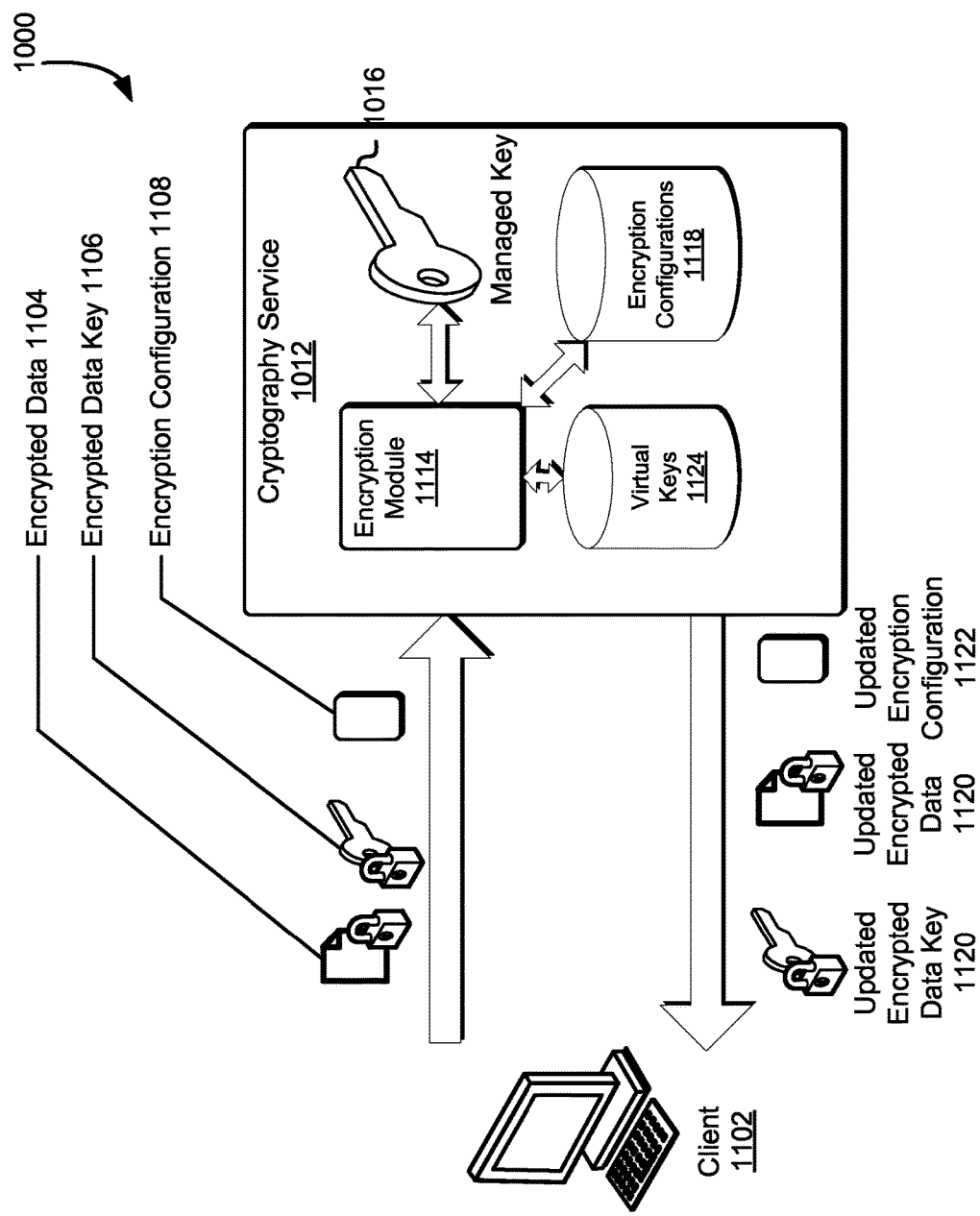
FIG. 10 illustrates an environment in which various embodiments can be implemented.

FIG. 9 describes an example environment 900 for implementing aspects in accordance with various embodiments. In FIG. 9, a client 902 may make a request to the cryptography service for a virtual key, the request including a key identifier 906, an encryption context 908, and client capabilities 910. In some embodiments, the client capabilities provided as part of the request may include a list of plugins supported by the client.

The cryptography service may receive the request and the encryption module 916 may determine that the client does not support a required plugin. In some embodiments, the encryption module, may make available to the client, a virtual key 922 retrieved from a store of virtual keys 928 in accordance with environment 800. The encryption module may also make available to the client a plugin 924 and/or executable code 926 that are operable to obtain a cryptographic key referenced by the virtual key 922. In an embodiment, the encryption configuration may, after selecting the virtual key 928 and check whether the client supports the plugins in the virtual key's reference type by querying the client capabilities 910 provided in the request. The encryption configuration may, upon determining that the client capabilities are insufficient for loading a plugin identified in the virtual key's reference type, obtain the plugin and/or executable code that is useable to support the plugin identified in the reference type. In some embodiments, a plugin installation package and executable code for running the plugin installation package may be included in the cryptography service's response to the request. In some embodiments, the executable code 926 includes HyperText Markup Language ("HTML"), Extensible Markup Language ("XML"), JavaScript, Cascading Style Sheets ("CSS"), another appropriate client-side structured language, or any combination thereof. In some embodiments, the plugin may include binary executable code (i.e., code that has been compiled). Note that, while referred to as a "plugin," executable code that is provided may, in some embodiments, may not be classified as a plugin.

Figure 11:
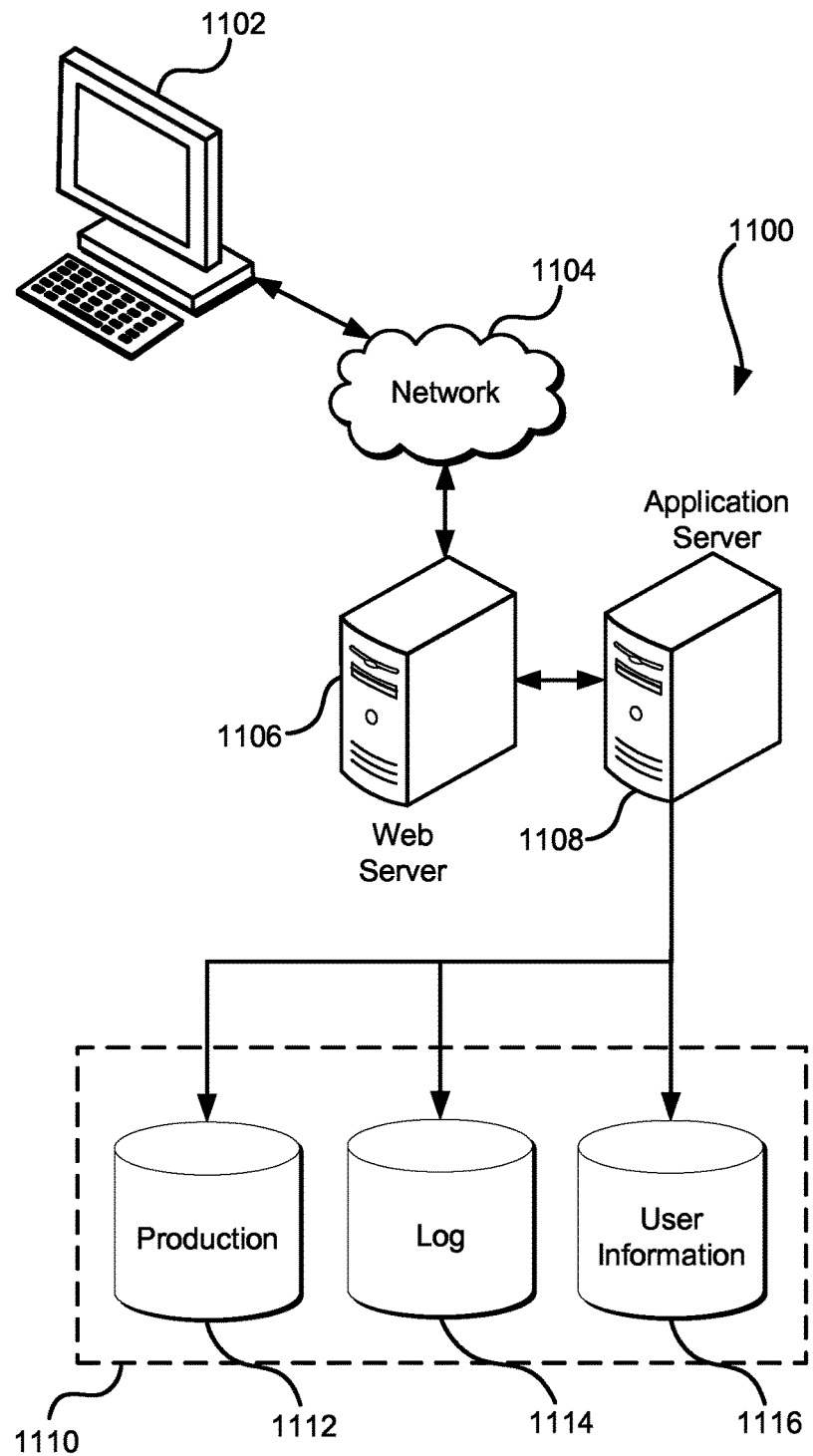
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
   memory to store executable instructions that, if executed by one or more hardware processors, cause at least one computing device to:
   receive, from a client, a request for a data key, the request specifying a key identifier;
   select, based at least in part on the key identifier, a key from a set of keys managed for an entity associated with the client, the set of keys including
   a subset of virtual keys, the subset of virtual keys being associated with a set of cryptographic keys that is inaccessible to the at least one computing device and managed by different computing device; and
   provide, based at least in part on the key being a member of the subset of virtual keys, a cryptographic configuration and a reference to the different computing device, the reference including
   information usable to cause the different computing device to provide the data key.

2. The system of claim 1, wherein the executable instructions further cause the at least one computing device to:
   receive an application programming interface request to add a second key to the subset of virtual keys; and
   fulfill the application programming interface request by at least associating an identifier for the second key with a second reference to the different computing device.

3. The system of claim 1, wherein:
   the request for the data key specifies one or more capabilities of the client; and
   the executable instructions further cause the at least one computing device to select the cryptographic configuration to match the one or more capabilities of the client.

4. The system of claim 1, wherein the reference comprises information usable by the client to determine credentials usable to cause the different computing device to provide the data key.

5. The system of claim 1, wherein:
the executable instructions further cause the computer system to determine, based at least in part on the key identifier, a cryptographic configuration that specifies a cryptographic algorithm to be used; and
the system further comprises the client, wherein the client is configured to:
generate the request;
receive the cryptographic configuration;
obtain, using the cryptographic configuration, the data key from the different computing device; and
use the data key to perform the cryptographic algorithm.

6. A computer-implemented method, comprising:
receiving, at computer system, a request for a key, the request indicating a set of cryptographic algorithms and a key identifier of a key stored by the computer system;
selecting, based at least in part on the key identifier and the set of cryptographic algorithms, a cryptographic algorithm; and
providing a response to the request that comprises the key and indicates the cryptographic algorithm.

7. The computer-implemented method of claim 6, further comprising:
receiving a second request for a second key, the second request specifying a second key identifier different from the key identifier; and
providing a response to the request that includes a referral to a computing device, different from the computer system, operable to provide the second key.

8. The computer-implemented method of claim 6, wherein:
the method further comprises encrypting the key using a cryptographic key identified by the key identifier, to generate an encrypted data key; and
the response further comprises the encrypted data key.

9. The computer-implemented method of claim 6, further comprising selecting the key identified by the key identifier from a set of cryptographic keys that comprises a subset of cryptographic keys inaccessible to the computer systems.

10. The computer-implemented method of claim 6, wherein:
the request for the key comprises an encryption context;
the method further comprises obtaining an encrypted data key by at least causing the key to be encrypted using a cryptographic key identified by the key identifier and an authenticated mode of an encryption algorithm, with additional authenticated data for the authenticated mode of the encryption algorithm being based at least in part on the encryption context; and
the response further comprises the encrypted data key.

11. The computer-implemented method of claim 10, further comprising selecting the cryptographic algorithm further based at least in part on the encryption context.

12. The computer-implemented method of claim 10, wherein the encryption context specifies information about data to be encrypted using the key.

13. The computer-implemented method of claim 6, wherein:
the request is received from a requestor and specifies one or more capabilities of the requestor; and
the method further comprises selecting the cryptographic algorithm further based at least in part on the one or more capabilities.

14. The computer-implemented method of claim 13, further comprising selecting the cryptographic algorithm further based at least in part on a ranking of cryptographic algorithms that is associated with the key identifier.

15. A non-transitory computer-readable storage medium to store executable instructions that, if executed by one or more processors of a computer system, cause the computer system to at least:
receive, from a first computing device, a response to a first request, the first request specifying a key identifier;
determine that the response indicates a referral to a second computing device; and
transmit a second request to the second computing device to obtain a key.

16. The non-transitory computer-readable storage medium of claim 15, wherein the executable instructions further include instructions that cause the computer system to:
receive, from the first computing device, another response to a third request specifying another key identifier;
determine that the other response includes another key; and
use the other key to encrypt data.

17. The non-transitory computer-readable storage medium of claim 15, wherein executable instructions further include instructions that cause the computer system to:
receive, from the first computing device, another response to a third request specifying another key identifier;
determine that the other response includes another key and an encrypted data key encrypted under a cryptographic key identified by the other key identifier:
encrypt data to produce encrypted data; and
associate the encrypted data with the encrypted data key.

18. The non-transitory computer-readable storage medium of claim 15, wherein the second computing device is accessible over a private network that includes the computer system.

19. The non-transitory computer-readable storage medium of claim 15, wherein the second computing device is a hardware security module.

20. The non-transitory computer-readable storage medium of claim 15, wherein:
the response specifies a cryptographic algorithm; and
as a result of the response specifying the cryptographic algorithm, the executable instructions further include executable instructions that cause the computer system to encrypt data using the key and the cryptographic algorithm.

21. The non-transitory computer-readable storage medium of claim 15, wherein:
the response further includes information sufficient to determine credentials for obtaining the key from the second computing device; and
the executable instructions further include instructions that cause the computer system to:
determine the credentials based at least in part on the information; and
obtain, based at least in part on the credentials, the key from the second computing device.

* * * * *